(12) United States Patent
Enomoto et al.

(10) Patent No.: US 9,003,097 B2
(45) Date of Patent: Apr. 7, 2015

(54) INFORMATION TRANSFER APPARATUS, INFORMATION TRANSFER SYSTEM AND INFORMATION TRANSFER METHOD

(75) Inventors: Nobuyuki Enomoto, Tokyo (JP); Yasunori Okajima, Tokyo (JP); Tadashi Haneishi, Tokyo (JP); Go Mase, Tokyo (JP); Takeshi Katou, Tokyo (JP)

(73) Assignee: Biglobe Inc., Tokyo (JP)

( * ) Notice: Subject to any disclaimer, the term of this patent is extended or adjusted under 35 U.S.C. 154(b) by 486 days.

(21) Appl. No.: 13/513,851

(22) PCT Filed: Oct. 7, 2010

(86) PCT No.: PCT/JP2010/067613
§ 371 (c)(1),
(2), (4) Date: Jun. 4, 2012

(87) PCT Pub. No.: WO2011/074314
PCT Pub. Date: Jun. 23, 2011

(65) Prior Publication Data
US 2012/0246378 A1 Sep. 27, 2012

(51) Int. Cl.
*G06F 13/00* (2006.01)
*G06F 13/38* (2006.01)

(52) U.S. Cl.
CPC ..................... *G06F 13/38* (2013.01)

(58) Field of Classification Search
CPC ....................................................... G06F 13/38
USPC ................................................. 710/315–316
See application file for complete search history.

(56) References Cited

U.S. PATENT DOCUMENTS 5,974,486 A * 10/1999 Siddappa ........................ 710/53
6,012,103 A *  1/2000 Sartore et al. ..................... 710/8
(Continued)

FOREIGN PATENT DOCUMENTS

JP  2002-063066 A  2/2002
JP  2002-278691 A  9/2002
(Continued)

OTHER PUBLICATIONS

International Search Report in PCT/JP2010/067613 dated Dec. 28, 2010 (English Translation Thereof).
(Continued)

*Primary Examiner* — Paul R Myers
(74) *Attorney, Agent, or Firm* — McGinn Intellectual Property Law Group, PLLC

(57) ABSTRACT

An information transfer apparatus of the present invention is an information transfer apparatus including a network interface connected to a server that distributes data, via a network, and a USB interface connected to an information presentation apparatus that presents the data, the information transfer apparatus transferring the data distributed from the server to the information presentation apparatus; and the information transfer apparatus includes: a switch that enables or disables connection with the information presentation apparatus via the USB interface; and a control section that judges whether or not the data distributed from the server has been updated, enables connection with the information presentation apparatus by the switch to transfer the data to the information presentation apparatus only upon judging that the data has been updated, and, after transferring the data, disables the connection with the information presentation apparatus by the switch.

14 Claims, 8 Drawing Sheets

(56) References Cited

U.S. PATENT DOCUMENTS

| | | |
|---|---|---|
| 6,449,666 B2 * | 9/2002 | Noeldner et al. ............... 710/23 |
| 6,476,825 B1 * | 11/2002 | Croy et al. .................... 715/716 |
| 6,493,650 B1 * | 12/2002 | Rodgers et al. ............... 702/150 |
| 6,738,834 B1 * | 5/2004 | Williams et al. .................. 710/8 |
| 6,930,709 B1 * | 8/2005 | Creamer et al. ........... 348/211.3 |
| 7,512,720 B2 * | 3/2009 | Schultz et al. .................. 710/14 |
| 7,526,580 B2 * | 4/2009 | Uno ................................ 710/14 |
| 7,562,360 B2 * | 7/2009 | Tai et al. ...................... 717/178 |
| 7,853,748 B2 * | 12/2010 | Fleming ........................ 710/311 |
| 8,417,841 B2 * | 4/2013 | Nagai et al. ..................... 710/16 |
| 2004/0236804 A1 * | 11/2004 | Bots et al. ..................... 707/204 |
| 2006/0109376 A1 * | 5/2006 | Chaffee et al. ............. 348/423.1 |
| 2006/0248162 A1 | 11/2006 | Kawasaki |
| 2007/0005193 A1 * | 1/2007 | Nelson et al. ................. 700/286 |
| 2007/0180198 A1 * | 8/2007 | Aoki et al. .................... 711/141 |
| 2007/0195167 A1 | 8/2007 | Ishiyama |
| 2009/0132616 A1 * | 5/2009 | Winter et al. ................. 707/204 |
| 2009/0234978 A1 * | 9/2009 | Uno ................................ 710/14 |
| 2010/0107150 A1 | 4/2010 | Kamada et al. |
| 2011/0296050 A1 * | 12/2011 | Cherukuri ..................... 709/232 |

FOREIGN PATENT DOCUMENTS

| | | |
|---|---|---|
| JP | 2002-312230 A | 10/2002 |
| JP | 2003-108380 A | 4/2003 |
| JP | 2003-131995 A | 5/2003 |
| JP | 2003-266880 A | 9/2003 |
| JP | 2004-118291 A | 4/2004 |
| JP | 2005-031898 A | 2/2005 |
| JP | 2006-94376 A | 4/2006 |
| JP | 2006-094376 A | 4/2006 |
| JP | 2006-309516 A | 11/2006 |
| JP | 2007-221660 A | 8/2007 |
| JP | 2007-310659 A | 11/2007 |
| WO | WO 2008/114491 A1 | 9/2008 |

OTHER PUBLICATIONS

Japanese Office Action dated Apr. 2, 2013, with partial English translation.

* cited by examiner

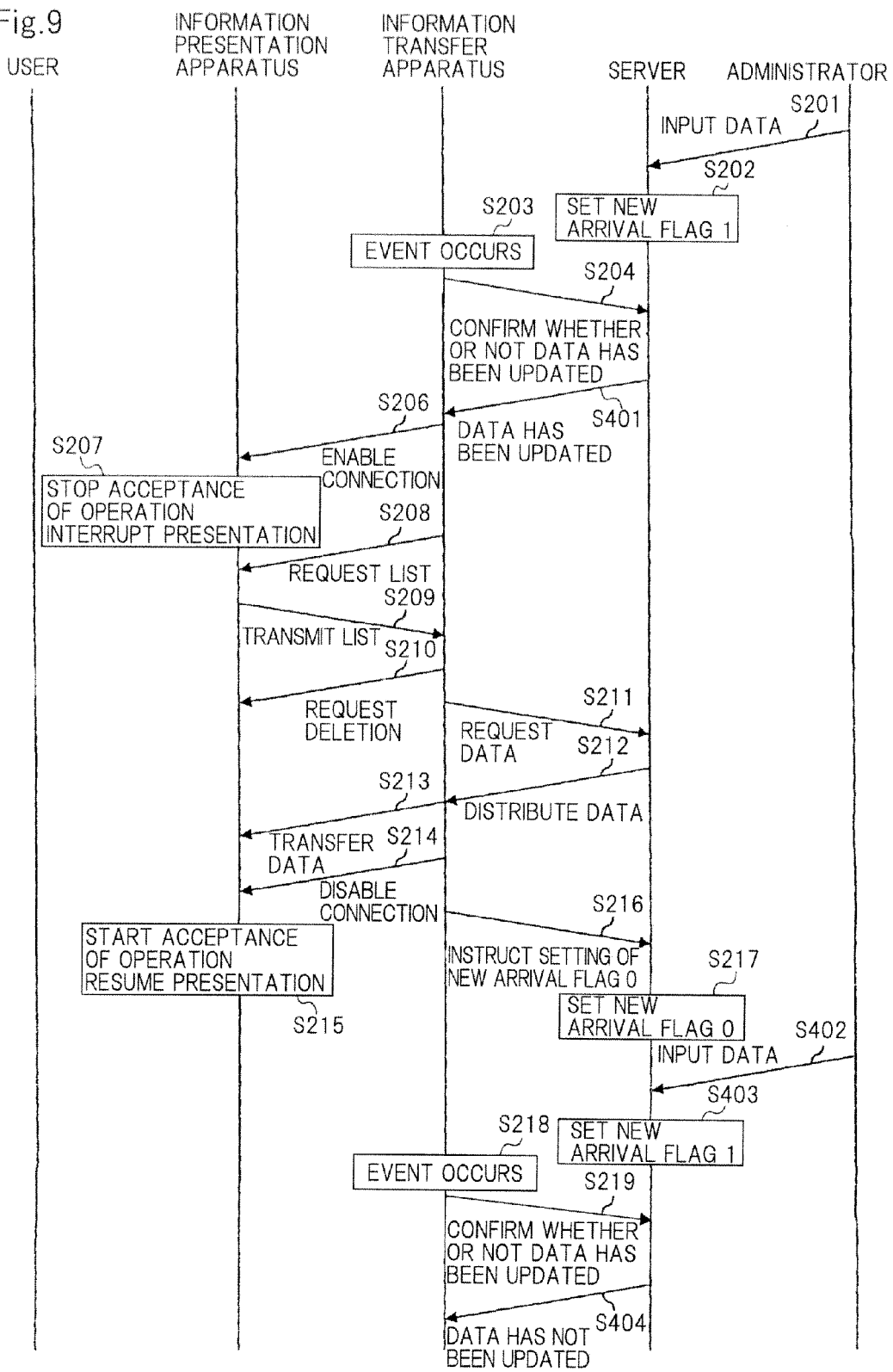

INFORMATION TRANSFER APPARATUS, INFORMATION TRANSFER SYSTEM AND INFORMATION TRANSFER METHOD

TECHNICAL FIELD

The present invention relates to an information transfer apparatus, an information transfer system and an information transfer method for transferring data distributed from a server to an information presentation apparatus.

BACKGROUND ART

Transferring data of contents, such as an image, music and a video, between two apparatuses having a USB (Universal Serial Bus) interface and mutually connected via a USB cable or the like is an operation that is commonly performed.

One of the two apparatuses performing data transfer is a USB host managing connection between the apparatuses, and the other is a USB device in accordance with management by the USB host. As a concrete example of an apparatus to be the USB host, a personal computer is used. As a concrete example of an apparatus to be the USB device, a digital camera, a digital photo frame, a mobile music player or the like is used.

Connection between the USB host and the USB device is enabled when the apparatuses are electrically connected via the power line and signal line of a USB cable or the like and disabled when at least one from among the power line and signal line is electrically disconnected.

The USB device has a function of, when connection with the USB host is enabled at the time of transferring data, giving priority to an operation from the USB host and locking the USB device to disable an operation on the USB device, in order to prevent malfunction and damage to data due to conflict between operations.

Therefore, in order to operate the USB device after finishing data transfer, it is necessary to disable connection with the USB host, for example, by pulling out the USB cable, and this becomes a troublesome operation.

In Patent Literature 1, a method for enabling an operation of an USB device (digital camera) connected to an USB host (printer) via a USB cable is described.

According to the method described in Patent Literature 1, in the case of performing data transfer, the connection between the printer and the digital camera is enabled by a user's operation, such as pressing a button of the printer. The digital camera transfers data obtained by image-taking by the user to the printer. When the data transfer ends, the printer electrically disconnects the power line of the USB cable to disable connection with the digital camera.

Since connection between the USB host and the USB device is not enabled except while data transfer is performed, it is possible to operate the USB device, even if the USB device is connected to the USB host via the USB cable.

Recently, an information transfer system has been popularized which is provided with a server that distributes contents, an information presentation apparatus that presents (displays/reproduces) the data, and an information transfer apparatus that transfers the data distributed from the server to the information presentation apparatus.

If, in the case of performing data transfer between the information transfer apparatus and the information presentation apparatus, the method described in Patent Literature 1 is applied, with the information transfer apparatus and the information presentation apparatus functioning as a USB host and a USB device, respectively, it is possible to operate the information presentation apparatus even if the information presentation apparatus is connected to the information transfer apparatus via a USB cable, because connection between the information transfer apparatus and the information presentation apparatus is not enabled except while data transfer is being performed.

RELATED ART LITERATURE

Patent Literature

Patent Literature 1: JP2006-094376A

DISCLOSURE OF THE INVENTION

Data may be updated in an information transfer system, and, in order to present the updated data on an information presentation apparatus, it is necessary to transfer the data to the information presentation apparatus in response to the update.

In the method described in Patent Literature 1, if data is updated by a user taking a picture using a digital camera, which is a USB device, the user can recognize that the data has been updated. Therefore, the user can perform data transfer from the USB device to a USB host with his own operation as a trigger only when data has been updated.

In the information transfer system described above, however, it is difficult for the user to recognize whether or not data distributed from a server has been updated. Therefore, it is difficult to perform data transfer with a user operation as a trigger from an information transfer apparatus, which is a USB host, to an information presentation apparatus, which is a USB device only when data has been updated. There is a problem that, when the user performs an operation for data transfer, connection between the information transfer apparatus and the information presentation apparatus is enabled even though data has not been updated actually, and wasteful data transfer is performed, so that it becomes impossible to operate the information presentation apparatus.

An object of the present invention is to provide an information transfer apparatus, an information transfer system and an information transfer method which are capable of solving the problem described above.

SUMMARY OF THE INVENTION

In order to achieve the above object, an information transfer apparatus of the present invention is:

an information transfer apparatus comprising a network interface connected to a server that distributes data, via a network, and a USB interface connected to an information presentation apparatus that presents the data, the information transfer apparatus transferring the data distributed from the server to the information presentation apparatus and comprising:

a switch that enables or disables connection with the information presentation apparatus via said USB interface; and a control section that judges whether or not the data distributed from the server has been updated, enables connection with the information presentation apparatus by said switch to transfer the data to the information presentation apparatus only upon judging that the data has been updated, and, after transferring the data, disables the connection with the information presentation apparatus by said switch.

In order to achieve the above object, an information transfer system of the present invention is:

an information transfer system comprising a server that distributes data, an information presentation apparatus that presents the data, and an information transfer apparatus that comprises a network interface connected to said server, via a network and a USB interface connected to said information presentation apparatus, said information transfer apparatus transferring the data distributed from said server to said information presentation apparatus, wherein said information transfer apparatus comprises:

a switch that enables or disables connection with said information presentation apparatus via said USB interface; and a control section that judges whether or not the data distributed from said server has been updated, enables connection with said information presentation apparatus by said switch to transfer the data to said information presentation apparatus only upon judging that the data has been updated, and, after transferring the data, disables the connection with said information presentation apparatus by said switch.

In order to achieve the above object, an information transfer method of the present invention is:

an information transfer method applied to an information transfer apparatus that comprises a network interface connected to a server that distributes data, via a network, and a USB interface connected to an information presentation apparatus that presents the data, the information transfer apparatus transferring the data distributed from the server to the information presentation apparatus, and the method comprising:

judging whether or not the data distributed from the server has been updated;

enabling connection with the information presentation apparatus by the USB interface to transfer the data to the information presentation apparatus only upon judging that the data has been updated; and disabling the connection with the information presentation apparatus after transferring the data.

Effects of the Invention

According to the present invention, an information transfer apparatus judges whether or not data has been updated; enables connection with an information presentation apparatus via a USB interface to transfer the data to the information presentation apparatus only when the data has been updated; and disables the connection with the information presentation apparatus after transferring the data.

Therefore, data transfer is not performed if a data update has not been performed, and it is possible to prevent the transfer of wasteful data, and, as a result, the information presentation apparatus cannot be operated.

BRIEF DESCRIPTION OF DRAWINGS

FIG. 9 is a sequence diagram showing an operation of the information transfer system shown in FIG. 8.

EXEMPLARY EMBODIMENTS

Next, with reference to the accompanying drawings, exemplary embodiments will be described.

First Exemplary Embodiment

Figure 1:
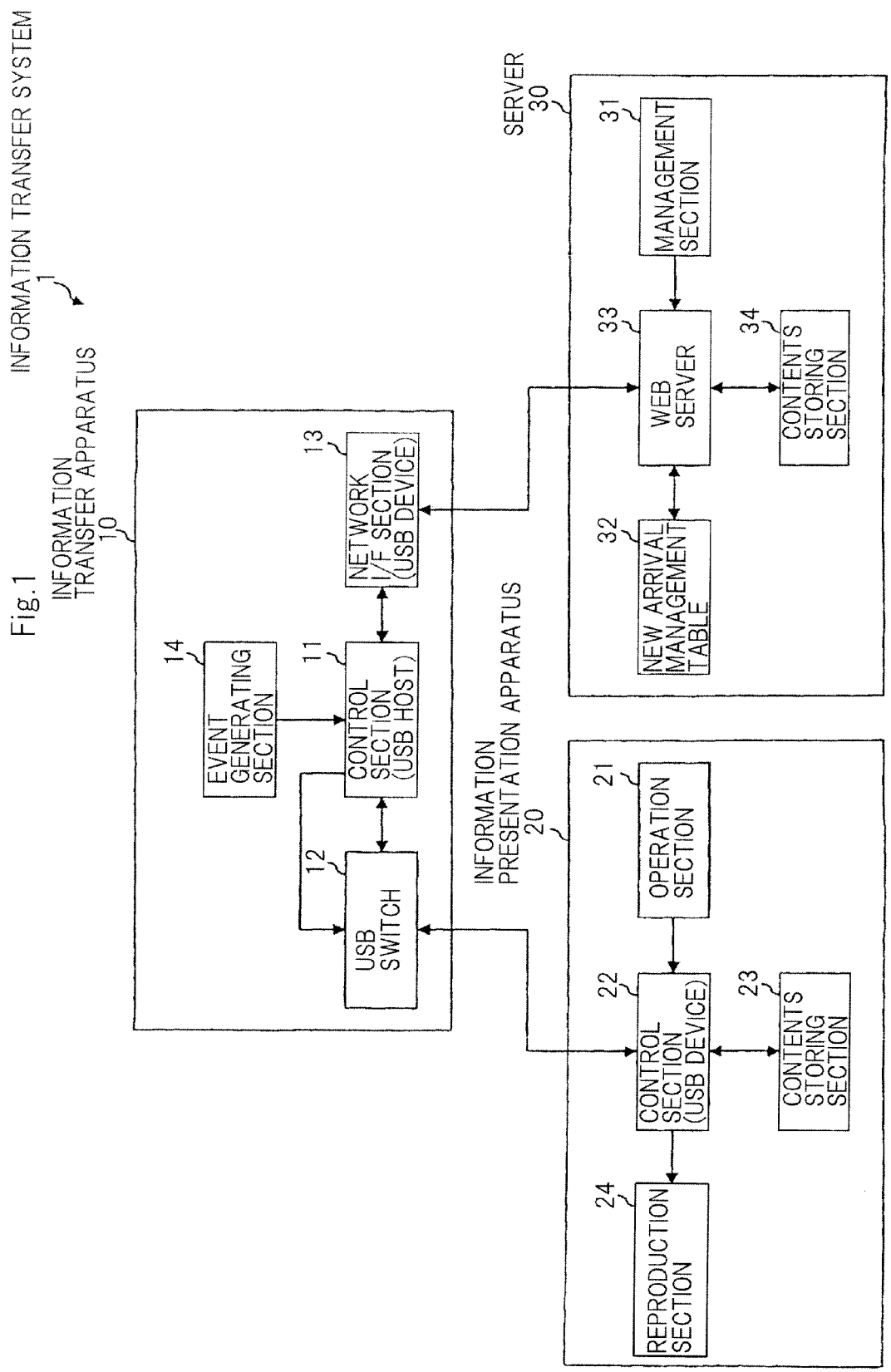
FIG. 1 is a block diagram showing a configuration of an information transfer system of a first exemplary embodiment.

FIG. 1 is a block diagram showing a configuration of an information transfer system of a first exemplary embodiment.

Information transfer system 1 shown in FIG. 1 has information transfer apparatus 10, information presentation apparatus 20 and server 30.

Information transfer apparatus 10 is connected to information presentation apparatus 20 via a USB cable or the like and is also connected to server 30 via a network such as the Internet, and it transfers data of contents, such as an image, music and a video, distributed from server 30 to information presentation apparatus 20. As information transfer apparatus 10, a small-sized terminal apparatus is assumed, and it is installed and used near information presentation apparatus 20.

Information presentation apparatus 20 presents (displays/reproduces) data transferred from information transfer apparatus 10 via a USB cable or the like. As concrete examples of information presentation apparatus 20, there are a digital camera, a digital photo frame, a mobile music player or the like.

Server 30 stores data inputted by an administrator of server 30, and distributes the stored data to information transfer apparatus 10 in response to a request from information transfer apparatus 10.

Next, a configuration of information transfer apparatus 10 will be described.

Information transfer apparatus 10 has control section 11, USB switch 12, network I/F section 13 and event generating section 14.

Control section 11 has two interfaces in order to connect with USB switch 12 though they are not shown in FIG. 1. One interface is a USB interface, and control section 11 transfers data to USB switch 12 via this USB interface. The other interface is a parallel interface such as a GPIO (General Purpose I/O) interface, and control section 11 instructs USB switch 12 to enable or disable connection with information presentation apparatus 20 via this parallel interface.

Control section 11 has a USB interface in order to connect with network I/F section 13 though it is not shown in FIG. 1, and receives data distributed from server 30 via the USB interface.

Control section 11 has a USB host function of becoming a USB host when being connected to information presentation apparatus 20 or network I/F section 13 via the USB interface and controlling information presentation apparatus 20 and network I/F section 13 which are USB devices.

Control section 11 performs a process for confirming whether or not data stored in server 30 has been updated, with notification of occurrence of an event from event generating section 14 as a trigger. If the data has been updated, control section 11 enables connection with information presentation apparatus 20 by USB switch 12, transfers the data distributed from server 30 to information presentation apparatus 20, and, when the data transfer is completed, disables connection with information presentation apparatus 20.

Control section 11 is constituted by a CPU (Central Processing Unit) which performs arithmetic processing, a memory which performs temporary storage processing, and the like.

USB switch 12 enables or disables connection between information transfer apparatus 10 and information presentation apparatus 20 via the USB interface, in accordance with an instruction from control section 11 via a parallel interface such as a GPIO interface. When connection with information presentation apparatus 20 is enabled, data transferred from control section 11 is immediately transferred to information presentation apparatus 20.

USB switch 12 enables connection between information transfer apparatus 10 and information presentation apparatus 20 by electrically connecting both apparatuses via the power line and signal line of a USB cable or the like and disables connection between both apparatuses by electrically disconnecting at least one from among the power line and the signal line. In the description below, it is assumed that, in the case of disabling a connection with information presentation apparatus 20, both the signal line and the power line are electrically disconnected unless otherwise specified.

When being connected with control section 11, network I/F section 13 becomes a USB device and transmits a request for confirmation of whether or not data has been updated, or a request for distribution of data, to server 30, or receives data distributed from server 30 in accordance with an instruction from control section 11.

A MAC address is allocated to network I/F section 13, and this MAC address is used as identification information for server 30 to identify information transfer apparatus 10.

Event generating section 14 is provided with a timer function, and it generates an event indicating a trigger for causing control section 11 to perform processing for confirming whether data has been updated or not in constant cycles (for example, 30 minutes) and notifies control section 11 of the occurrence of the event. Notification of occurrence of the event is performed, for example, by outputting a control signal from event generating section 14 to control section 11. Event generating section 14 is also provided with a function of generating an extraordinary event in response to pressing a button of information transfer apparatus 10.

Next, the configuration of information presentation apparatus 20 will be described.

Information presentation apparatus 20 has operation section 21, control section 22, contents storing section 23 and reproduction section 24.

Operation section 21 accepts an operation inputted by a user, and outputs an instruction corresponding to the accepted operation to control section 22. Specifically, operation section 21 accepts an operation, such as movement of a cursor, presentation of data, interruption of presentation and deletion of data, by pressing a button, or the like and outputs a corresponding instruction to control section 22.

When being connected to control section 11 (USB host) via the USB interface, control section 22 becomes a USB device, and operates data in contents storing section 23 in accordance with an instruction from control section 11. Specifically, control section 22 performs storage of data transferred from information transfer apparatus 10 into contents storing section 23, reading or deletion of stored data, acquisition of a list of stored data, and the like. Control section 22 also performs output of data stored in contents storing section 23 or a list to reproduction section 24, deletion of specified data among the stored data, or the like, in accordance with an instruction from operation section 21.

Control section 22 follows instructions from control section 11 and operation section 21 as described above. However, in order to prevent damage of data stored in contents storing section 23 due to a conflict between an instruction from control section 11 and an instruction from operation section 21, control section 22 performs exclusive control so as not to receive an instruction from operation section 21 while connection with control section 11 is enabled. Therefore, an operation by operation section 21 is possible only while connection with control section 11 is disabled.

Contents storing section 23 is configured by a general hard disk, flash memory or the like, and it performs data storage, presentation of a list of stored data, output and deletion of stored data, and the like in accordance with the processing of data by control section 22.

Reproduction section 24 receives data outputted from control section 22 and represents (displays/reproduces) the received data as an image, music, a video or the like. While connection between control section 22 and control section 11 is enabled, reproduction section 24 interrupts the presentation of data.

Next, a configuration of server 30 will be described.

Server 30 has management section 31, new arrival management table 32, Web server 33 and contents storing section 34.

When data of contents and identification information about information transfer apparatus 10 which is the distribution destination of the data are inputted by the administrator of server 30, management section 31 outputs the inputted data and identification information to Web server 33.

The identification information about information transfer apparatus 10 is a MAC address allocated to network I/F section 13 of that information transfer apparatus 10.

Figures 2, 3:
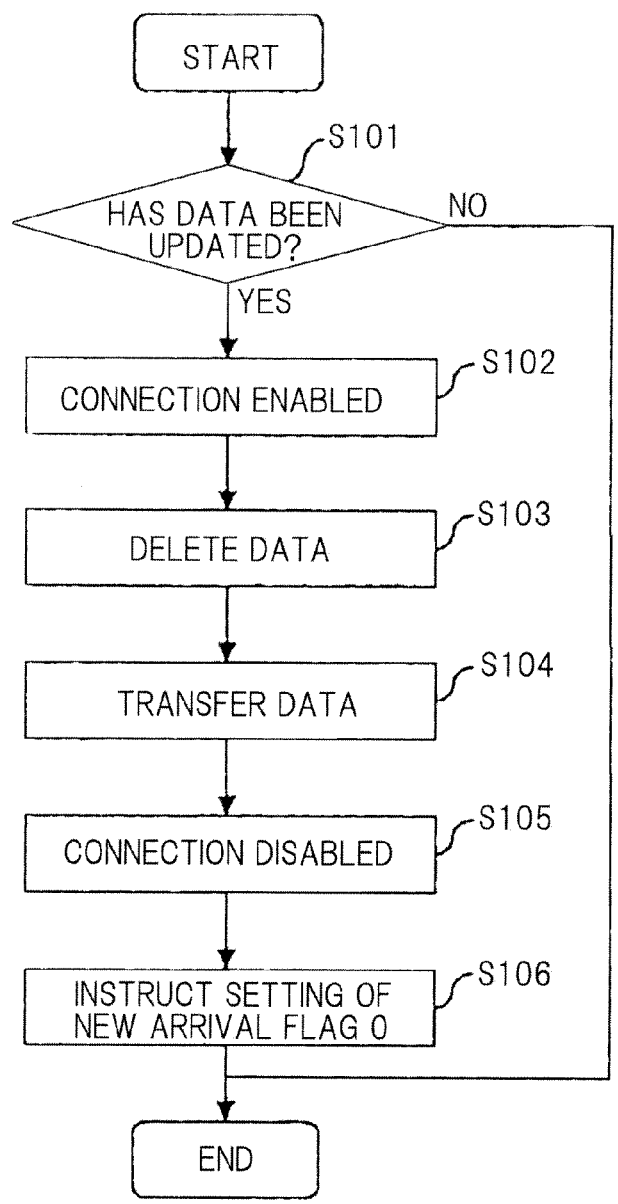
FIG. 2 is a diagram showing a new arrival management table shown in FIG. 1.
FIG. 3 is a flowchart showing an operation of a control section of an information transfer apparatus shown in FIG. 1.

As shown in FIG. 2, new arrival management table 32 is a table in which identification information about information transfer apparatus 10 (a MAC address allocated to network I/F section 13) and a new arrival flag indicating whether or not data, whose distribution destination is information transfer apparatus 10, has been updated, are associated with each other, and 1 is set as the new arrival flag if the data has been updated and 0 is set if the data has not been updated.

When the data and the identification information about information transfer apparatus 10 are outputted from management section 31, Web server 33 sets 1 as a new arrival flag associated with the identification information in new arrival management table 32 and outputs the data to contents storing section 34.

When a request for confirmation of whether or not data has been updated is transmitted from information transfer apparatus 10, Web server 33 confirms a new arrival flag associated with identification information about that information transfer apparatus 10 in new arrival management table 32 and notifies information transfer apparatus 10 of whether or not the data has been updated. Furthermore, when a request for distribution of data is transmitted from information transfer apparatus 10. Web server 33 reads the data stored in contents storing section 34 and distributes the read data to information transfer apparatus 10.

Contents storing section 34 stores the data outputted from Web server 33 into a directory corresponding to each item of identification information about information transfer apparatus 10. Contents storing section 34 performs presentation of a list of stored data, output and deletion of stored data, and the like in accordance with an instruction from Web server 33.

Next, operation of control section 11 will be described.

FIG. 3 is a flowchart showing an operation of a process for confirming whether or not data has been updated performed by control section 11.

When being notified of the occurrence of an event from event generating section 14, control section 11 transmits a request for confirmation of whether or not data has been updated, to Web server 33 (step S101). If Web server 33 provides notification to the effect that the data has not been updated (step S101: NO), control section 11 ends the process.

If Web server 33 provides notification to the effect that the data has been updated (step S101: YES), control section 11 instructs USB switch 12 to enable connection with control section 22.

When detecting that connection with control section 22 is enabled (step S102), control section 11 instructs control section 22 to delete data stored in contents storing section 23 (that is, old data transferred before) (step S103).

After the data deletion is completed, control section 11 transmits a request for distribution of data to Web server 33, transfers the data which has been distributed from Web server 33 in response to the request, to control section 22, instructs control section 22 to store the transferred data into contents storing section 23, and completes the data transfer (step S104).

After the data transfer is completed, control section 11 instructs USB switch 12 to disable connection with control section 22. When detecting that the connection is disabled (step S105), control section 11 instructs Web server 33 to set 0 as a new arrival flag associated with identification information about information transfer apparatus 10 (step S106).

Next, operation of information transfer system 1 will be described.

Figure 4:
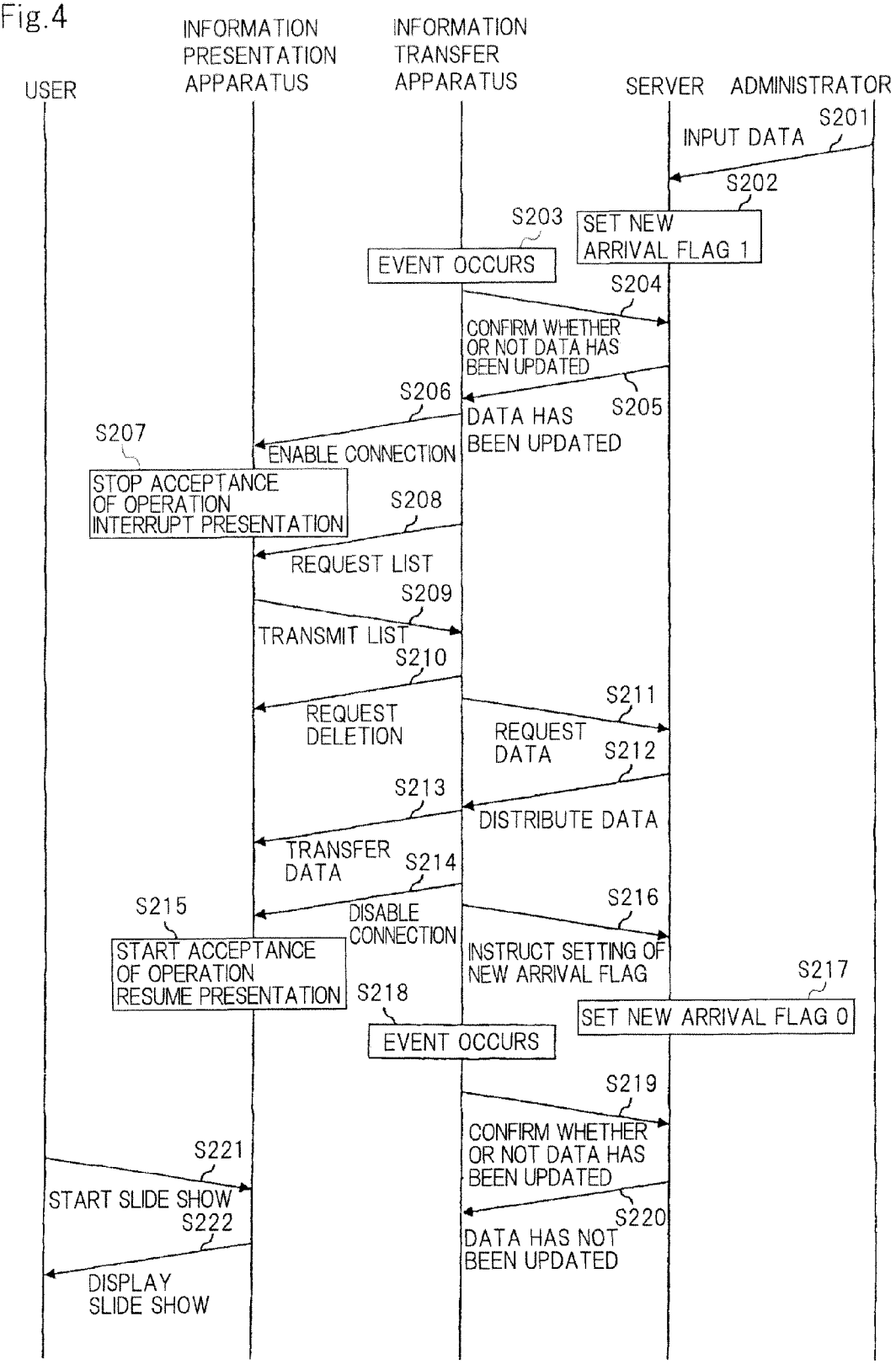
FIG. 4 is a sequence diagram showing an operation of the information transfer system shown in FIG. 1.

FIG. 4 is a sequence diagram showing the operation of information transfer system 1.

It is assumed that a MAC address 00004C00ABCD is allocated to network I/F section 13 and that event generating section 14 notifies the occurrence of an event every 30 minutes.

It is also assumed that contents storing section 23 stores data (00A.jpg, 00B.jpg and 00C.jpg) of old content transferred before.

Furthermore, it is assumed that data (001.jpg, 002.jpg and 003.jpg) of the contents of three images and identification information (the MAC address, 00004C00ABCD) about information transfer apparatus 10 which is the distribution destination of the data have been inputted by the administrator of server 30.

The operation of information transfer system 1 will be described below by dividing the operation into an operation performed at the time of inputting data to server 30, an operation performed when the data has been updated, an operation performed when the data has not been updated, and an operation of presenting the data.

(1-1) Operation Performed at the Time of Inputting Data to Server 30

When the data (001.jpg, 002.jpg and 003.jpg) and the identification information about information transfer apparatus 10 (the MAC address 00004C00ABCD) are inputted to management section 31 by the administrator of server 30 (step S201), server 30 stores the data into a directory corresponding to the identification information in contents storing section 34 and sets 1 as a new arrival flag corresponding to the identification information in new arrival management table 32 (step S202).

(1-2) Operation Performed when Data has been Updated

When 30 minutes have passed since the last occurrence of an event, and occurrence of an event is notified from event generating section 14 (step S203), information transfer apparatus 10 starts the process for confirming whether or not the data has been updated and transmits a request for confirmation of whether or not the data has been updated, by control section 11 (step S204). At this time, information transfer apparatus 10 reads the MAC address 00004C00ABCD allocated to network I/F section 13 and notifies server 30 of the read MAC address together with the confirmation request.

When receiving the request for confirmation of whether or not the data has been updated, which has been transmitted from information transfer apparatus 10, by Web server 33, server 30 searches new arrival management table 32 using the MAC address notified together with the confirmation request as a key. Then, since 1 is set as a new arrival flag associated with the notified MAC address, server 30 notifies information transfer apparatus 10 to the effect that the data has been updated (step S205).

When being notified from server 30 to the effect that the data has been updated, information transfer apparatus 10 enables connection with information presentation apparatus 20 by USB switch 12 (step S206).

When detecting that connection with information transfer apparatus 10 is enabled, information presentation apparatus 20 stops acceptance of an operation performed by operation section 21, and, if presentation of data (such as display of a slide show of images) is being performed by reproduction section 24, compulsorily interrupts the presentation of the data (step S207).

When detecting that connection with information presentation apparatus 20 is enabled, information transfer apparatus 10 requests a list of data stored in contents storing section 23 (step S208), and information presentation apparatus 20 transmits a list of the data (00A.jpg, 00B.jpg and 00C.jpg) stored in contents storing section 23 to information transfer apparatus 10 (step S209).

When receiving the list transmitted from information presentation apparatus 20, by control section 11, information transfer apparatus 10 requests information presentation apparatus to delete the data shown in the list, that is, the data of old content of images transferred before (step S210), and information presentation apparatus 20 deletes the data requested to be deleted, by control section 22. When the data deletion is completed, information presentation apparatus 20 notifies information transfer apparatus 10 to that effect.

When being notified to the effect that the data deletion has been completed, information transfer apparatus 10 transmits a request for distribution of data, to server 30 by control section 11 (step S211). At this time, information transfer apparatus 10 notifies server 30 of the MAC address allocated to network I/F section 13 together with the distribution request.

When receiving the data distribution request transmitted from information transfer apparatus 10, by Web server 33, server 30 reads data (001.jpg, 002.jpg and 003.jpg) in a directory corresponding to the MAC address notified together with the data distribution request, in contents storing section 34, and distributes the read data to information transfer apparatus 10 (step S212).

Information transfer apparatus 10 transfers the data distributed from server 30 to information presentation apparatus 20, by control section 11 (step S213). Information presentation apparatus 20 stores the transferred data into contents storing section 23, and the data transfer is completed.

After the data transfer is completed, information transfer apparatus 10 disables connection with information presentation apparatus 20 by USB switch 12 (step S214).

When detecting that connection with information transfer apparatus 10 is disabled, information presentation apparatus 20 resumes acceptance of an operation by operation section 21 and resumes interrupted presentation of data by reproduction section 24 (step S215).

When detecting that connection with information presentation apparatus 20 is disabled, by control section 11, information transfer apparatus 10 notifies server 30 of the MAC address allocated to network I/F section 13 and instructs server 30 to set 0 as a new arrival flag associated with the MAC address (step S216). Server 30 sets 0 as the new arrival flag associated with the notified MAC address in new arrival management table 32, by Web server 33 (step S217).

(1-3) Operation Performed when Data has not been Updated

When 30 minutes have passed since the last occurrence of an event, and occurrence of an event is notified from event generating section 14 (step S218), information transfer apparatus 10 transmits a request for confirmation of whether or not the data has been updated to server 30 by control section 11, similar to step S204 (step S219). At this time, information transfer apparatus 10 notifies server 30 of the MAC address allocated to network I/F section 13 together with the confirmation request.

Similar to step S205, server 30 searches new arrival management table 32 using the MAC address notified from information transfer apparatus 10 as a key, by Web server 33. Since 0 is set as a new arrival flag associated with the notified MAC address, server 30 notifies information transfer apparatus 10 to the effect that the data has not been updated (step S220). When being notified to the effect that the data has not been updated, information transfer apparatus 10 ends the process.

(1-4) Operation of Presenting Data

Information presentation apparatus 20 accepts an operation inputted by the user, by operation section 21 (step S221). Here, it is assumed that an operation of requesting display of a slide show of three images (001.jpg, 002.jpg and 003.jpg) has been inputted.

Information presentation apparatus 20 reads the data stored in contents storing section 23 (001.jpg, 002.jpg and 003.jpg) and displays a slide show by reproduction section 24 (step S222).

Thus, according to this exemplary embodiment, information transfer apparatus 10 judges whether or not data has been updated, and, only when the data has been updated, enables connection with information presentation apparatus 20 via the USB interface and transfers the data to information presentation apparatus 20. Then, after the data is transferred, information transfer apparatus 10 disables the connection with information presentation apparatus 20.

Therefore, data transfer is not performed when data update has not been performed, and it is possible to prevent the transfer of wasteful data, and, as a result, the information presentation apparatus 20 cannot be operated.

Because connection with information presentation apparatus 20 is enabled or disabled by USB switch 12, it is possible to perform both data transfer and operation of information presentation apparatus 20 while information transfer apparatus 10 and information presentation apparatus 20 are connected via the USB cable.

Though, in this exemplary embodiment, description has been made concerning the example in which event generating section 14 generates an event in constant cycles or by pressing of a button, the present invention is not limited thereto.

For example, event generating section 14 may be provided with a clock function instead of the timer function so that occurrence of an event can be notified during a time period late at night or early in the morning during which the user is expected not to be viewing data on information presentation apparatus 20 (for example, at 03:00:00 every morning). By notifying occurrence of an event during a time period when the user is expected not to be viewing data, and performing data transfer if data has been updated, it is possible to lower the possibility that presentation of data by information presentation apparatus 20 will be interrupted.

Event generating section 14 may be provided with an illuminance, infrared or sound sensor function instead of the timer function so that occurrence of an event can be notified in the case where the user is expected not to be near information transfer apparatus 10, that is, in the case where illuminance measured by the illuminance sensor is equal to or below a threshold for a predetermined time or more, in the case where infrared radiation generated by the human body is not detected by the infrared sensor for a predetermined time or more, or in the case where noise measured by the sound sensor is equal to or below a threshold for a predetermined time or more. By notifying occurrence of an event if the user is not near information transfer apparatus 10 and is expected not to be viewing data, and by performing data transfer if data has been updated, it is possible to lower the possibility that presentation of data by information presentation apparatus 20 will be interrupted.

Though, in this exemplary embodiment, description has been made concerning example in which control section 11 reads the MAC address of network I/F section 13 and uses the MAC address as identification information, the present invention is not limited thereto.

For example, control section 11 may store the IP address of information transfer apparatus 10, the user ID of information transfer apparatus 10 or the like as identification information in advance instead of the MAC address. If information transfer apparatus 10 can connect to a mobile phone network, the ID of a SIM card may be used.

Second Exemplary Embodiment

Figure 5:
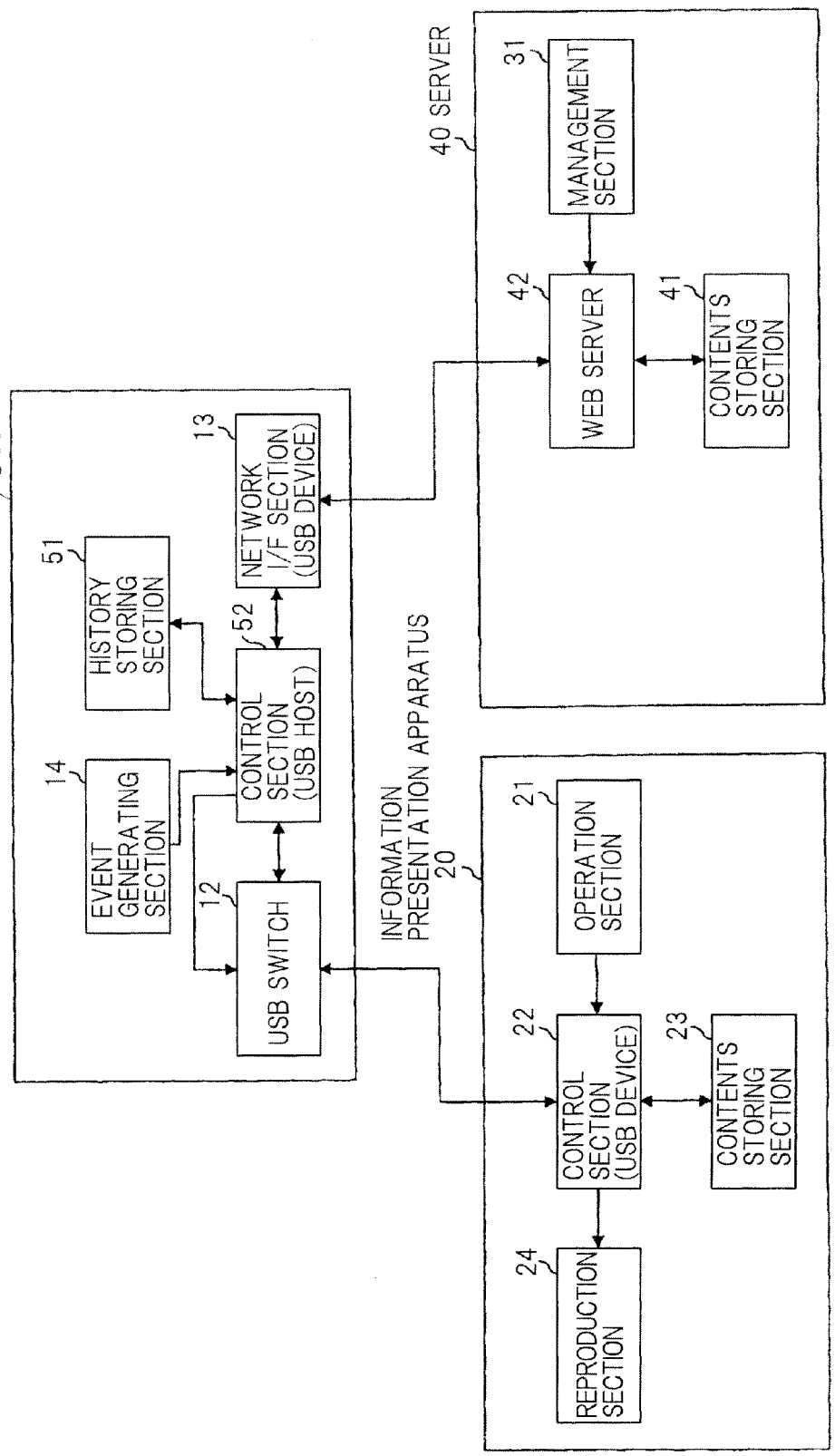
FIG. 5 is a block diagram showing a configuration of an information transfer system of a second exemplary embodiment.

FIG. 5 is a block diagram showing the configuration of an information transfer system of a second exemplary embodiment.

Information transfer system 2 shown in FIG. 5 is different from information transfer system 1 of the first exemplary embodiment in that server 30 is substituted for server 40 and in that information transfer apparatus 10 is substituted for information transfer apparatus 50.

Server 40 is different from server 30 in that contents storing section 34 is substituted for contents storing section 41, in that Web server 33 is substituted for Web server 42, and in that new arrival management table 32 is deleted.

Information transfer apparatus 50 is different from information transfer apparatus 10 in that history storing section 51 is newly added and in that control section 11 is substituted for control section 52.

Components similar to those in the first exemplary embodiment are given the same reference numerals, and thus description thereof will be omitted.

Contents storing section 41 stores data inputted by the administrator of server 40 and the date and time (time stamp) of updating the data.

When distributing data, Web server 42 transmits the time stamp of the data together with the data.

History storing section 51 stores the latest time stamp of data transferred to information presentation apparatus 20.

When distributing data to information presentation apparatus 20, control section 52 causes history storing section 51 to store the time stamp of the data.

When performing a process for confirming whether or not data has been updated, control section 52 transmits a request for transmission of the time stamp of the data stored in contents storing section 41 to Web server 42, and judges whether or not the data has been updated by comparing the time stamp transmitted in response to the request with the time stamp stored in history storing section 51.

Next, operation of information transfer system 2 will be described.

Figure 6:
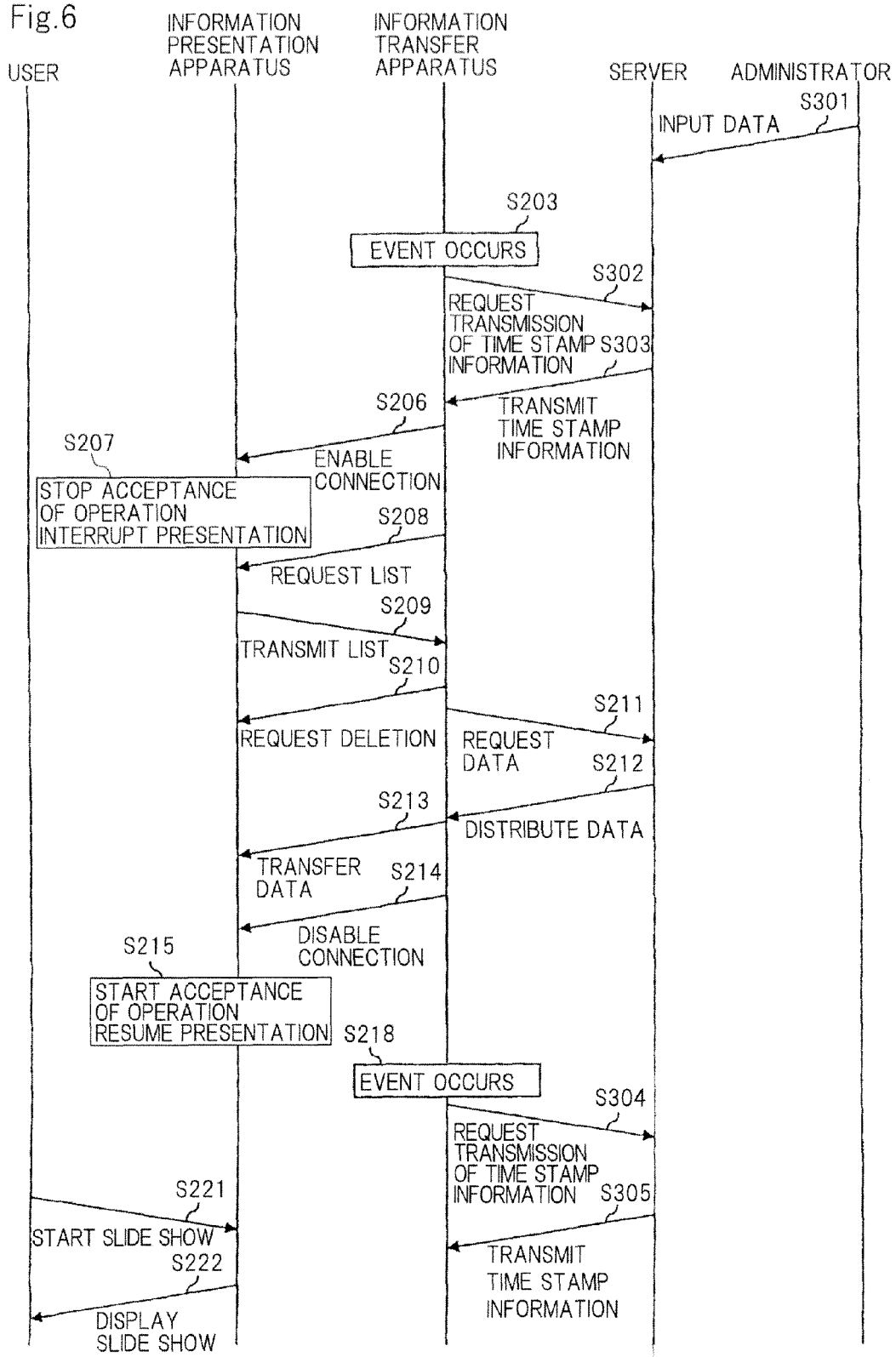
FIG. 6 is a sequence diagram showing an operation of the information transfer system shown in FIG. 5.

FIG. 6 is a sequence diagram showing the operation of information transfer system 2.

Similarly to the first exemplary embodiment, it is assumed that the MAC address 00004C00ABCD is allocated to network I/F section 13, and that event generating section 14 notifies the occurrence of an event every 30 minutes.

It is also assumed that contents storing section 51 stores the time stamp (Nov. 1, 2009, 21:00:00) of data (00A.jpg, 00B.jpg and 00C.jpg) of old content of images transferred before.

It is also assumed that contents storing section 23 stores the data (00A.jpg, 00B.jpg and 00C.jpg) of the old content of images transferred before.

Furthermore, it is assumed that data (001.jpg, 002.jpg and 003.jpg) of three images the time stamp of which indicates Nov. 2, 2009, 20:00:00, and identification information (the MAC address 00004C00ABCD) about information transfer apparatus 50 which is the destination of distribution of the data have been inputted by the administrator of server 40.

In FIG. 6, processings similar to those in FIG. 4 are given the same reference symbols, and thus description thereof will be omitted.

(2-1) Operation Performed at the Time of Inputting Data to Server 40

When the data (001.jpg, 002.jpg and 003.jpg) of the three images and the identification information about information transfer apparatus 50 are inputted to management section 31 by the administrator of server 40 (step S301), server 40 stores the inputted data and the time stamp of the data into a directory corresponding to the identification information in contents storing section 41.

(2-2) Operation Performed when Data has been Updated

When being notified of the occurrence of an event from event generating section 14 (step S203), information transfer apparatus 50 transmits a request for transmission of the time stamp of data stored in contents storing section 41 to server 40 by control section 52 (step 302). At this time, information transfer apparatus 50 notifies server 40 of the MAC address allocated to network I/F section 13 together with the request for transmission of the time stamp.

When receiving the time stamp transmission request transmitted from information transfer apparatus 50, by Web server 42, server 40 searches contents storing section 41 using the MAC address notified together with the time stamp transmission request as a key. Then, server 40 confirms that the latest time stamp in the directory corresponding to the MAC address indicates Nov. 2, 2009, 20:00:00, and transmits the time stamp (Nov. 2, 2009, 20:00:00) to information transfer apparatus 50 (step S303).

Information transfer apparatus 50 compares the time stamp (Nov. 1, 2009, 21:00:00) recorded in history storing section 51 with the time stamp (Nov. 2, 2009, 20:00:00) transmitted from server 40 by control section 52. If the time stamp transmitted from server 40 is newer than the time stamp stored in history storing section 51, information transfer apparatus 50 judges that the data has been updated.

If it is judged that the data has been updated, data transfer to information presentation apparatus 20 is performed by a process similar to that of the first exemplary embodiment (steps S206 to S214).

Information transfer apparatus 50 causes history storing section 51 to store the time stamp (Nov. 2, 2009, 20:00:00) of the data (001.jpg, 002.jpg and 003.jpg) transferred to information presentation apparatus 20, by control section 52.

(2-3) Operation Performed when Data has not been Updated

When being notified of the occurrence of an event from event generating section 14 (step S218), information transfer apparatus 50 transmits a request for transmission of a time stamp to server 40 by control section 52 similar to step S302 (step S304). At this time, information transfer apparatus 50 notifies server 40 of the MAC address allocated to network I/F section 13 together with the time stamp transmission request.

Similar to step S303, when receiving the time stamp transmission request by Web server 42, server 40 searches contents storing section 41 using the MAC address notified together with the time stamp transmission request as a key. Then, server 40 confirms that the latest time stamp in the directory corresponding to the MAC address indicates Nov. 2, 2009, 20:00:00, and transmits the time stamp (Nov. 2, 2009, 20:00:00) to information transfer apparatus 50 (step S305).

Information transfer apparatus 50 compares the time stamp (Nov. 2, 2009, 20:00:00) recorded in history storing section 51 with the time stamp (Nov. 2, 2009, 20:00:00) transmitted from server 40 by control section 52. Here, since the time stamp transmitted from server 40 corresponds to the time stamp stored in history storing section 51, information transfer apparatus 50 judges that the data has not been updated, and ends the process.

Thus, according to this exemplary embodiment, server 40 transmits the date and time (time stamp) of updating data to information transfer apparatus 50 together with the data.

Information transfer apparatus 50 also stores the time stamp of data transferred to information presentation apparatus 20. When judging whether or not the data has been updated, information transfer apparatus 50 requests server 40 to transmit a time stamp, compares the time stamp transmitted from server 40 with the stored time stamp to judge whether or not the data has been updated.

Since information transfer apparatus 50 judges whether or not data has been updated by comparing time stamps in this way, it is not necessary to set a new arrival flag each time data is inputted or transferred as done in the first exemplary embodiment.

Though, in this exemplary embodiment, control section 52 causes history storing section 51 to store the time stamp of data transferred to information presentation apparatus 20 and judges whether or not the data has been updated by comparing the time stamp with a time stamp transmitted from server 40, the present invention is not limited thereto.

For example, control section 52 may cause history storing section 51 to store all data transferred to information presentation apparatus 20, and judge whether or not data has been updated by checking the data against a list of data stored in contents storing section 41.

Furthermore, it is also possible to indicate data by a hash value so that control section 52 may cause history storing section 51 to store the hash values of all data transferred to information presentation apparatus 20, and judge whether data has been updated or not by checking the data against the hash values stored in contents storing section 41.

Third Exemplary Embodiment

Figure 7:
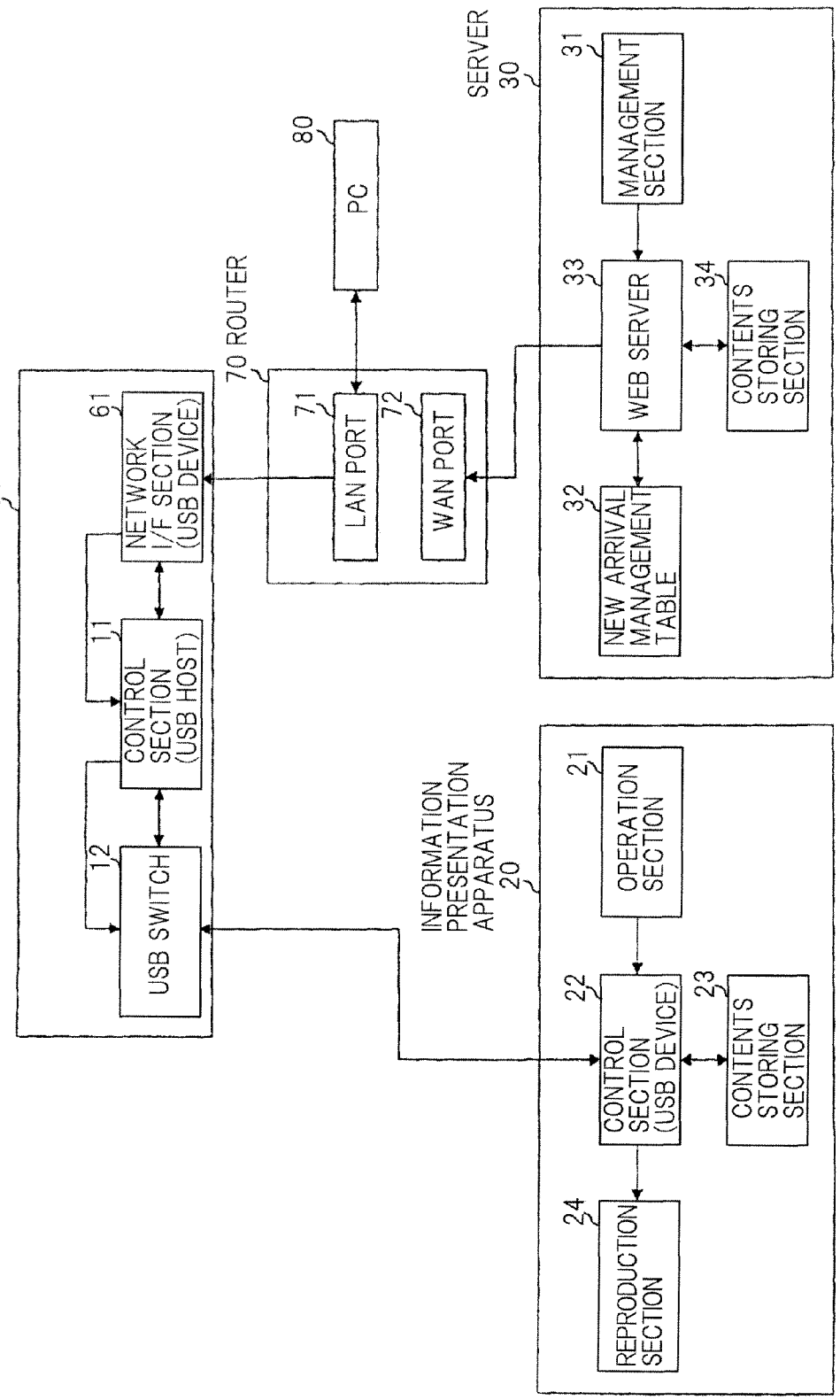
FIG. 7 is a block diagram showing a configuration of an information transfer system of a third exemplary embodiment.

FIG. 7 is a block diagram showing a configuration of an information transfer system of a third exemplary embodiment.

Information transfer system 3 shown in FIG. 7 is different from information transfer system 1 of the first exemplary embodiment in that information transfer apparatus 10 is substituted for information transfer apparatus 60.

FIG. 7 shows router 70 which has been omitted, between server 30 and information transfer apparatus 60. Information transfer system 3 of this exemplary embodiment is different from information transfer system 1 of the first exemplary embodiment in that PC 80 connected to router 70 is added.

Router 70 is a broadband router installed in homes and the like, and it has LAN (Local Area Network) port 71 and WAN (Wide Area Network) port 72. On the basis of an IP address described on a packet of data, router 70 transfers the packet between LAN port 71 and WAN port 72.

LAN port 71 is a terminal for connecting to an apparatus on the LAN network side (for example, on the home side), and, in FIG. 7, information transfer apparatus 60 and PC 80 are connected via a LAN cable or a wireless LAN. LAN port 71 is provided with an Ethernet® hub function, and it transfers a packet among information transfer apparatus 60, PC 80 and WAN port 72 on the basis of a MAC address.

WAN port 72 is a terminal for connecting to the WAN network side (for example, the Internet side), and, in FIG. 7, it is connected to server 30 via a network such as the Internet.

PC 80 is a general personal computer connected to router 70, and it is provided with a WEB browser and the like.

When being powered on, PC 80 periodically transmits a broadcast signal which includes identification information about that PC 80 such as a MAC address. This broadcast signal is transmitted to each apparatus connected to LAN port 71, which is, in FIG. 7, information transfer apparatus 60, via router 70.

Information transfer apparatus 60 is different from information transfer apparatus 10 in that network I/F section 13 is substituted for network I/F section 61 and in that event generating section 14 is deleted.

Components similar to those in the first exemplary embodiments are given the same reference numerals, and thus description thereof will be omitted.

Network I/F section 61 stores the MAC address of PC 80 used by the same user as the user of information transfer apparatus 60 in advance. Network I/F section 61 receives a broadcast signal transmitted from PC 80, and judges whether a MAC address indicated by the received broadcast signal corresponds to the stored MAC address. Network I/F section 61 counts up the number of times of receiving a broadcast signal indicating a MAC address judged to correspond to the stored MAC address, and notifies control section 11 of the occurrence of an event if the counted-up number is equal to or above a threshold.

Thus, according to this exemplary embodiment, information transfer apparatus 60 receives a broadcast signal indicating the MAC address of PC 80 that is present in the same LAN, which has been transmitted from that PC 80, counts up the number of times of receiving a broadcast signal indicating the MAC address of PC 80 used by the same user as the user of information transfer apparatus 60, which is stored in advance, and performs a process for confirming whether or not data has been updated if the counted-up number is equal to or above a threshold.

To receive a broadcast signal transmitted from PC 80 that is used by the same user as the user of information transfer apparatus 60 means that the user is using PC 80, and presentation of data by information presentation apparatus 20 is not performed during the time. Therefore, information transfer apparatus 60 performs the process for confirming whether or not data has been updated, and, if the data has been updated, transfers the data to information presentation apparatus 20. By doing this, it is possible to lower the possibility that presentation of data by information presentation apparatus 20 will be interrupted.

Though, in this exemplary embodiment, description has been made with the use of the example in which network I/F section 61 notifies the occurrence of an event if the number of times of receiving a broadcast signal that indicates a MAC address that corresponds to a stored MAC address is equal to or above a threshold, the present invention is not limited thereto.

For example, network I/F section 61 may immediately notify the occurrence of an event if it receives a broadcast signal that indicates a MAC address corresponds to the stored MAC address.

Fourth Exemplary Embodiment

Figure 8:
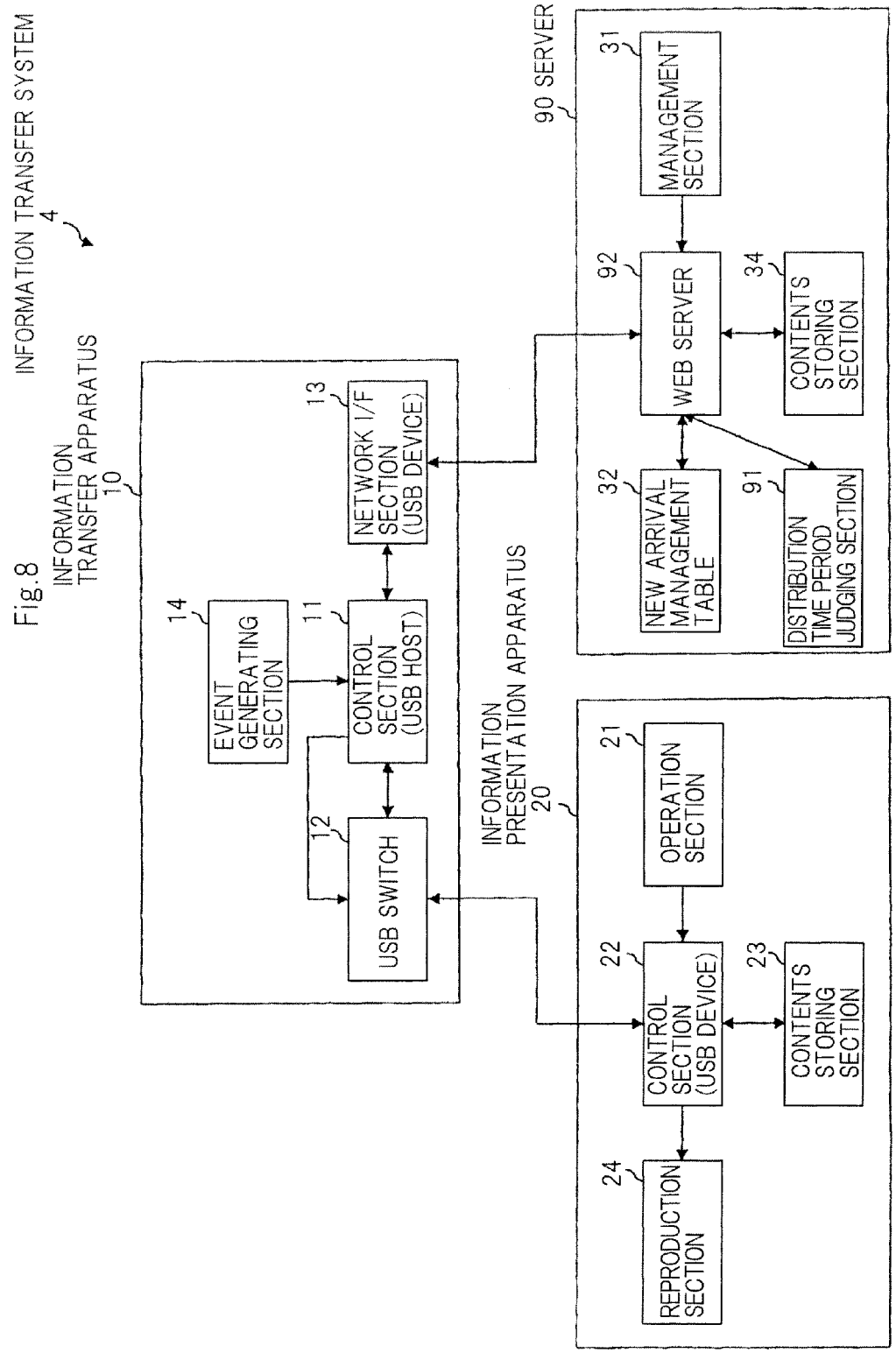
FIG. 8 is a block diagram showing a configuration of an information transfer system of a fourth exemplary embodiment.

FIG. 8 is a block diagram showing a configuration of an information transfer system of a fourth exemplary embodiment.

Information transfer system 4 shown in FIG. 8 is different from information transfer system 1 of the first exemplary embodiment in that server 30 is substituted for server 90.

Server 90 is different from server 30 in that distribution time period judging section 91 is newly added and that Web server 33 is substituted for Web server 92.

Distribution time period judging section 91 is provided with a function of managing time, and it stores a distribution-possible time period set in advance as a time period during which presentation of data by information presentation apparatus 20 is expected not to be performed. When receiving an inquiry about whether or not it is currently the distribution-possible time period from Web server 92, distribution time period judging section 91 returns 1 indicating that distribution is possible, as a distribution possible/impossible flag indicating whether or not distribution is possible if it is currently the distribution-possible time period, and returns 0 indicating that distribution is impossible if it is currently not the distribution-possible time period.

When receiving a request for confirmation of whether or not data has been updated, which has been transmitted from information transfer apparatus 10, Web server 92 inquires of distribution time period judging section 91 whether or not it is currently the distribution-possible time period. Then, if there is a reply from distribution time period judging section 91 to the effect that it is currently the distribution-possible time period, and the data has been updated, Web server 92 notifies information transfer apparatus 10 to the effect that the data has been updated. If there is a reply to the effect that it is currently not the distribution-possible time period, Web server 92 notifies information transfer apparatus 10 to the effect that the data has not been updated irrespective of whether or not the data has been updated.

Next, operation of information transfer system 4 will be described.

FIG. 9 is a sequence diagram showing the operation of information transfer system 4.

Similarly to the first exemplary embodiment, it is assumed that the MAC address 00004C00ABCD is allocated to network I/F section 13, and that event generating section 14 notifies the occurrence of an event every 30 minutes.

It is also assumed that en generating section 14 notified the last occurrence of an event at 04:15:00 in the morning.

It is also assumed that contents storing section 23 stores data (00A.jpg, 00B.jpg and 00C.jpg) of old content of images transferred before.

It is also assumed that data (001.jpg, 002.jpg and 003.jpg) of three images as content and identification information (the MAC address 00004C00ABCD) about information transfer apparatus 10 which is the distribution destination of the data have been inputted by the administrator of server 90.

It is also assumed that a period from 01:00:00 in the morning to 04:59:59 in the morning is set for distribution time period judging section 91 as a distribution-possible time period, and that the current time is 04:40:00 in the morning.

In FIG. 9, processing operations similar to those in FIG. 4 are given the same reference symbols, and thus description thereof will be omitted.

(3-1) Operation Performed when Data has been Updated and it is Currently a Distribution-Possible Time Period When the occurrence of an event is notified from event generating section 14 at 04:45:00 in the morning (step S203) because 30 minutes have passed since the time of the last occurrence of an event (04:15:00 in the morning), information transfer apparatus 10 transmits a request for confirmation of whether or not data has been updated to server 90 by control section 11 (step S204). At this time, information transfer apparatus 10 notifies the MAC address 00004C00ABCD allocated to network I/F section 13 together with the request for confirmation of whether or not the data has been updated.

When receiving the request for confirmation of whether or not the data has been updated, which has been transmitted from information transfer apparatus 10, by Web server 92, server 90 searches new arrival management table 32 using the MAC address notified together with the confirmation request as a key. Here, 1 is set as a new arrival flag associated with the notified MAC address.

Web server 92 inquires of distribution time period judging section 91 whether or not it is currently a distribution-possible time period. Since the current time is 04:45:00 in the morning, which is within the distribution-possible period, distribution time period judging section 91 returns 1 indicating that distribution is possible, to Web server 92 as a distribution possible/impossible flag.

Since 1 is set as a new arrival flag, and a distribution possible/impossible flag 1 is returned from distribution time period judging section 91, server 90 notifies information transfer apparatus 10 to the effect that the data has been updated (step S401), and information transfer apparatus 10 judges that the data has been updated on the basis of the notification.

If it is judged that the data has been updated, data transfer to information presentation apparatus 20 is performed by a process similar to that of the first exemplary embodiment (steps S206 to S216).

(3-2) Operation Performed when Data has been Updated and it is Currently not a Distribution-Possible Time Period After data is inputted at step S201, data is further inputted by the administrator of server 90 (step S402), and 1 is set as a new arrival flag in new arrival management table 32 (step S403).

When the occurrence of an event is notified from event generating section 14 at 05:15:00 in the morning (step S218) because 30 minutes have passed since the time at which the last event occurred (04:45:00 in the morning), information transfer apparatus 10 transmits a request for confirmation of whether or not the data has been updated to server 90 by control section 11 (step S219). At this time also, information transfer apparatus 10 notifies a MAC address allocated to network I/F section 13 together with the request for confirmation of whether or not the data has been updated.

When receiving the request for confirmation of whether or not the data has been updated, which has been transmitted from information transfer apparatus 10, by Web server 92, server 90 searches new arrival management table 32 using the MAC address notified together with the confirmation request as a key. Here, 1 is set as a new arrival flag associated with the notified MAC address.

Web server 92 inquires of distribution time period judging section 91 whether or not it is currently a distribution-possible time period. Since the current time is 05:15:00 in the morning, which is not within the distribution-possible period, distribution time period judging section 91 returns 0 indicating that distribution is impossible, to Web server 92 as a distribution possible/impossible flag.

Since the distribution impossible flag 0 is returned from distribution time period judging section 91, server 90 notifies information transfer apparatus 10 to the effect that the data has not been updated though 1 is set as a new arrival flag (step S404). When being notified to the effect that the data has not been updated, from server 90, information transfer apparatus 10 ends the process.

Thus, according to this exemplary embodiment, if a request for confirmation of whether or not data has been updated, during a time period other than a distribution-possible time period set in advance, server 90 notifies information transfer apparatus 10 to the effect that the data has not been updated irrespective of whether or not the data has been updated.

Thus, since data transfer is performed only during the distribution-possible time period, it is possible to lower the possibility that presentation of data by information presentation apparatus 20 is interrupted.

The present invention has been described above by giving preferable exemplary embodiments. The present invention, however, is not necessarily limited to the above exemplary embodiments. It can be practiced being variously varied within the technical spirit thereof. It is naturally possible to mutually combine and practice the exemplary embodiments described above.

The method performed in the information transfer apparatus of the present invention may be applied to a program to be executed by a computer. The program can be stored in a recording medium and can be provided for the outside via a network.

This application claims priority based on Japanese Patent Application No. 2009-283885 filed on Dec. 15, 2009, the disclosure of which is hereby incorporated by reference thereto in its entirety.

The invention claimed is:

1. An information transfer apparatus comprising a network interface connected to a server that distributes data, via a network, and a USB interface connected to an information presentation apparatus that presents the data, the information transfer apparatus transferring the data distributed from the server to the information presentation apparatus and comprising:

a switch that enables or disables connection with the information presentation apparatus via said USB interface; and a control section that judges whether or not the data distributed from the server has been updated, enables connection with the information presentation apparatus by said switch to transfer the data to the information presentation apparatus only upon judging that the data has been updated, and, after transferring the data, disables the connection with the information presentation apparatus by said switch.

2. The information transfer apparatus according to claim 1, wherein the server stores identification information about the information transfer apparatus and a new arrival flag indicating whether or not the data distributed to the information transfer apparatus has been updated, associates the identification information and the new arrival flag with each other, and transmits the new arrival flag associated with the identification information about the information transfer apparatus, in response to a request from the information transfer apparatus; and said control section stores the identification information about the information transfer apparatus in advance, and, when judging whether or not the data has been updated, notifies the server of the stored identification information about the information transfer apparatus to request transmission of the new arrival flag and judges whether or not the data has been updated on the basis of the new arrival flag transmitted in response to the request.

3. The information transfer apparatus according to claim 1, wherein the server stores the identification information about the information transfer apparatus and a time stamp indicating a date and time of updating the data distributed to the information transfer apparatus, associates the identification information and the time stamp with each other, and transmits the time stamp associated with the identification information about the information transfer apparatus, in response to a request from the information transfer apparatus;

the information transfer apparatus further comprises a history storing section that stores the latest time stamp of the data transferred to the information presentation apparatus; and said control section stores the identification information about the information transfer apparatus in advance, and, when judging whether or not the data has been updated, notifies the server of the stored identification information about the information transfer apparatus to request transmission of the time stamp and judges whether or not the data has been updated by comparing a time stamp transmitted in response to the request with the time stamp stored in the history storing section.

4. The information transfer apparatus according to claim 1, further comprising an event generating section that notifies said control section of the occurrence of an event to be a trigger for judging whether or not the data has been updated, said control section judges whether or not the data has been updated if the occurrence of the event has been notified by said event generating section.

5. The information transfer apparatus according to claim 4, wherein said event generating section notifies said control section of the occurrence of the event at predetermined time intervals.

6. The information transfer apparatus according to claim 4, wherein said event generating section notifies said control section of the occurrence of the event when illuminance around the information transfer apparatus is measured, and the measured illuminance is equal to or below a threshold for a predetermined time or more, or when infrared radiation emitted from a human body around the information transfer apparatus is detected, and the infrared radiation emitted from the human body is not detected for a predetermined time or more, or when noise around the information transfer apparatus is measured, and the measured noise is equal to or below a threshold for a predetermined time or more.

7. The information transfer apparatus according to claim 1, wherein said network interface is connected to another apparatus via the network;

the other apparatus transmits a broadcast signal indicating identification information about the other apparatus when being powered on;

said network interface stores the identification information about the other apparatus used by the same user as the user of the information transfer apparatus in advance, judges, when receiving the broadcast signal transmitted from the other apparatus, whether the identification information about the other apparatus indicated by the received broadcast signal and the stored identification information correspond to each other, and, if judging that the pieces of identification information correspond to each other, notifies said control section of occurrence of an event to be a trigger for judging whether or not the data has been updated; and when being notified of the occurrence of the event by said network interface, said control section judges whether or not the data has been updated.

8. An information transfer system comprising a server that distributes data, an information presentation apparatus that presents the data, and an information transfer apparatus that comprises a network interface connected to said server via a network and a USB interface connected to said information presentation apparatus, said information transfer apparatus transferring the data distributed from said server to said information presentation apparatus, wherein said information transfer apparatus comprises:

a switch that enables or disables connection with said information presentation apparatus via said USB interface; and a control section that judges whether or not the data distributed from said server has been updated, enables connection with said information presentation apparatus by said switch to transfer the data to said information presentation apparatus only upon judging that the data has been updated, and, after transferring the data, disables the connection with said information presentation apparatus by said switch.

9. The information transfer system according to claim 8, wherein said server distributes the data only during a distribution-possible time period set in advance as a time period during which distribution of the data is possible.

10. An information transfer method applied to an information transfer apparatus that comprises a network interface connected to a server that distributes data, via a network, and a USB interface connected to an information presentation apparatus that presents the data, the information transfer apparatus transferring the data distributed from the server to the information presentation apparatus, and the method comprising:

judging whether or not the data distributed from the server has been updated;

enabling connection with the information presentation apparatus by the USB interface to transfer the data to the information presentation apparatus only upon judging that the data has been updated; and disabling the connection with the information presentation apparatus after transferring the data.

11. The information transfer apparatus according to claim 2, further comprising an event generating section that notifies said control section of the occurrence of an event to be a trigger for judging whether or not the data has been updated, wherein said control section judges whether or not the data has been updated if the occurrence of the event has been notified by said event generating section.

12. The information transfer apparatus according to claim 3, further comprising an event generating section that notifies said control section of the occurrence of an event to be a trigger for judging whether or not the data has been updated, wherein
said control section judges whether or not the data has been updated if the occurrence of the event has been notified by said event generating section.

13. The information transfer apparatus according to claim 2, wherein
said network interface is connected to another apparatus via the network;
the other apparatus transmits a broadcast signal indicating identification information about the other apparatus when being powered on;
said network interface stores the identification information about the other apparatus used by the same user as the user of the information transfer apparatus in advance, judges, when receiving the broadcast signal transmitted from the other apparatus, whether the identification information about the other apparatus indicated by the received broadcast signal and the stored identification information correspond to each other, and, if judging that the pieces of identification information correspond to each other, notifies said control section of occurrence of an event to be a trigger for judging whether or not the data has been updated; and
when being notified of the occurrence of the event by said network interface, said control section judges whether or not the data has been updated.

14. The info illation transfer apparatus according to claim 3, wherein
said network interface is connected to another apparatus via the network;
the other apparatus transmits a broadcast signal indicating identification information about the other apparatus when being powered on;
said network interface stores the identification information about the other apparatus used by the same user as the user of the information transfer apparatus in advance, judges, when receiving the broadcast signal transmitted from the other apparatus, whether the identification information about the other apparatus indicated by the received broadcast signal and the stored identification information correspond to each other, and, if judging that the pieces of identification information correspond to each other, notifies said control section of occurrence of an event to be a trigger for judging whether or not the data has been updated; and
when being notified of the occurrence of the event by said network interface, said control section judges whether or not the data has been updated.

* * * * *